United States Patent

Baskett

[11] Patent Number: 5,551,304
[45] Date of Patent: Sep. 3, 1996

[54] METHOD FOR SETTING SENSING POLARITY OF A SENSOR DEVICE

[75] Inventor: Ira E. Baskett, Tempe, Ariz.

[73] Assignee: Motorola, Inc., Schaumburg, Ill.

[21] Appl. No.: 549,112

[22] Filed: Oct. 27, 1995

[51] Int. Cl.$^6$ .................................................. G01L 1/00
[52] U.S. Cl. ................................................. 73/769; 73/4 R
[58] Field of Search .............................. 73/769, 4 R, 4 V, 73/1 B, 1 D; 29/595

[56] References Cited

U.S. PATENT DOCUMENTS

| | | |
|---|---|---|
| 4,461,984 | 7/1984 | Whitaker et al. |
| 4,777,826 | 10/1988 | Rud, Jr. et al. ............................ 73/766 |
| 4,910,628 | 3/1990 | Minagawa et al. |
| 4,986,131 | 1/1991 | Sugiyama et al. ......................... 73/766 |
| 5,241,850 | 9/1993 | Kawate ...................................... 73/1 D |
| 5,347,870 | 9/1994 | Dosch et al. .............................. 73/769 |

*Primary Examiner*—Robert Raevis
*Attorney, Agent, or Firm*—Bruce T. Neel

[57] ABSTRACT

A method for setting the sensing polarity of a sensor device (10) uses a switching bridge (22) having a wheatstone bridge configuration that is coupled to a sensing element (20) such that the polarity of the sensor device can be set by creating two electrical opens, for example with laser trimming along a cut line (59, 66), in parallel branches (30, 31) of the switching bridge. These opens are formed after the sensor device has been fully processed.

16 Claims, 2 Drawing Sheets

METHOD FOR SETTING SENSING POLARITY OF A SENSOR DEVICE

BACKGROUND OF THE INVENTION

The present invention relates, in general, to sensor devices and, more particularly, to a method for setting the sensing polarity of a sensor device, such as a pressure sensor.

Pressure sensors use a sensing die having a front side, which has most of the die's electronics formed thereon, and a back-side. Different sensing applications often require that either the front side or the back side of the sensing die be exposed to the media to be sensed. This requirement is dictated by factors, for example, such as the harshness of the media or the particular package design used to assemble the sensing die into a final, packaged sensor device.

The polarity of the sensing electronics of the pressure sensor are set depending on whether the front side or the back side of the sensing die will be used for sensing. In the past, this polarity was set by the metal mask used to form, for example, an aluminum interconnect level connecting the sensing element, such as a thin-membrane transducer, to amplifying electronics on the sensing die. However, because additional processing and assembly follows this metal mask process step, there is a significant time lag between the time of setting polarity and the completion of the sensor device.

The market for sensor devices is highly segmented, and the market demand, even for devices using the same particular type of sensing die, varies between front-side and back-side applications. Thus, because of the processing time lag above, it is necessary to hold excessive inventories of sensor devices, which are processed in advance with sensing polarities set for either front-side and back-side applications, in order to meet this variable demand in a timely manner.

Holding excessive inventory, however, leads to increased costs due to higher scrap rates for devices assembled in advance and not sold, increased manufacturing complexity because of the need to maintain two different mask sets (each set corresponds to a front-side or back-side application), and additional clerical work to track and monitor different lots of sensing dies pre-processed for either a front or back-side application. Further, the setting of the sensing polarity at the metal mask process stage results in the need for duplicate testing programs for ensuring operability of the fully-processed sensing die.

Thus, there is a need for an improved method for setting the sensing polarity of sensor devices that does not require the holding of excessive inventories of devices with sensing polarities pre-set at the metal mask step for either front or back-side applications. This need is driven by a desire to reduce manufacturing costs, to reduce customer order lead times, and to avoid the need for a manufacturing distinction between front and back-side applications until the trim-and-test stage, which follows assembly and packaging.

DETAILED DESCRIPTION OF THE DRAWINGS

Generally, the present invention provides a method for setting the sensing polarity of a sensor at a much later point in the manufacturing process than possible with the prior approach of setting this polarity using one of two metal masks. For example, prior pressure sensors using thin sensing membranes had a sensing polarity set depending on whether the front or back of the membrane would be used for contacting a media. The new method according to the present invention provides a switching bridge that is coupled to a sensing element such that the polarity of the sensor can be set by creating two electrical opens, for example with laser trimming, in the switching bridge. These opens can be formed after the sensing die is fully-processed, and in some cases, even after the die has been assembled and partially packaged.

Figure 1:
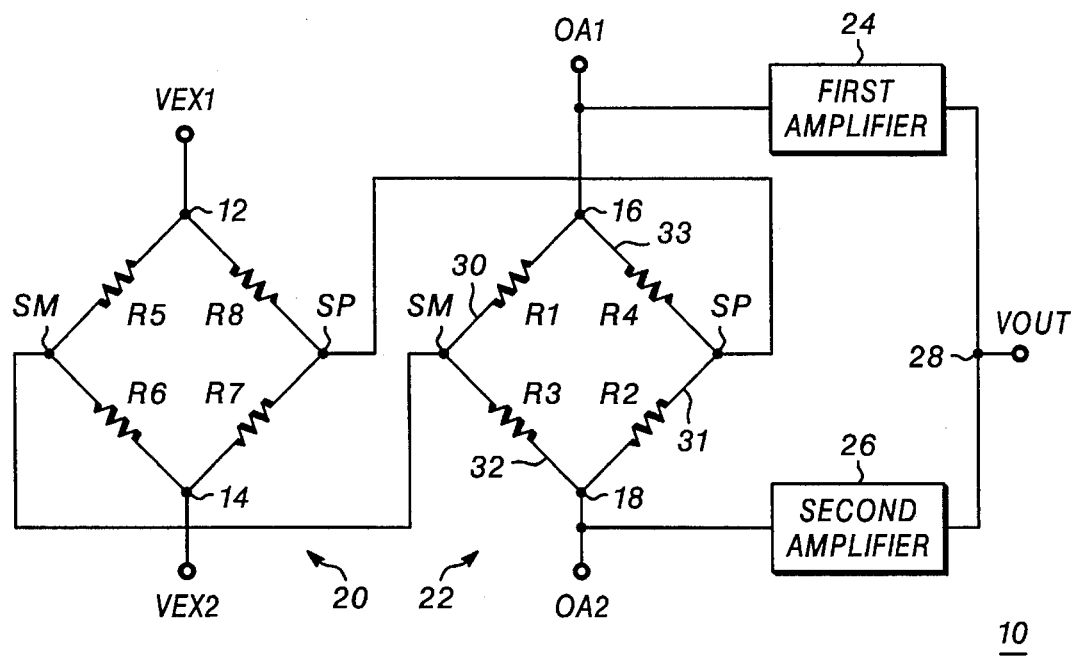
FIG. 1 is a circuit schematic of a sensor device including a switching bridge according to the present invention.

FIG. 1 is a circuit schematic of a sensor device 10 including a switching bridge 22 according to the present invention. Switching bridge 22 is coupled to a sensing element 20, which is, for example, a piezoresistive transducer (or strain gauge) disposed on a thin membrane as found on a pressure sensing die. Bridge 22 has an output signal OA1 at a node 16 coupled to a first amplifier 24 and a second output signal OA2 at a node 18 coupled to a second amplifier 26. Amplifiers 24 and 26 are both also coupled to a node 28 corresponding to a sensor device output signal VOUT. Amplifiers 24 and 26 are, for example, conventional operational amplifying circuits.

Sensing element 20 has inputs VEX1 and VEX2 for providing excitation voltage and ground signals at nodes 12 and 14, and further has two sensing outputs corresponding to nodes SP and SM. Sensing element 20 is illustrated as a wheatstone bridge with resistors R5, R6, R7, and R8, but one of skill in the art will recognize that many other types of transducers can be used with the present invention.

Switching bridge 22 has four branches 30–33 each corresponding to one of resistors R1, R2, R3, and R4, and bridge 22 is coupled to sensing element 20 at nodes SM and SP. As will be discussed below and according to the present invention, branches 30–33 are manufactured so that an electrical open can be formed in a pair of resistors R1, R2, R3, or R4 by, for example, laser trimming or other similar, known techniques including the use of fusible links or zener diode zapping. One of skill in the art will recognize that bridge 22 has a wheatstone bridge circuit configuration with inputs from nodes SP and SM of sensing element 20 and outputs to nodes 16 and 18. However, as will become more clear below, it should be noted that this configuration will contain electrical opens in the final, fully-operational sensor device 10.

According to the method of the present invention, the sensing polarity of sensor device 10 is set by creating electrical opens in a parallel pair of resistors R1, R2, R3, and R4. Specifically, for setting a first polarity, resistors R1 and R2 are electrically opened so that node SP is electrically coupled to first amplifier 24 and node SM is coupled to second amplifier 26. This first polarity corresponds, for example, to one of a front-side or a back-side pressure sensor application.

On the other hand, instead of setting a first polarity, a second sensing polarity can be set by electrically opening resistors R3 and R4 so that node SP is electrically coupled to second amplifier 26 and node SM is electrically coupled to first amplifier 24. This second polarity corresponds, for example, to the front or back-side application opposite to that corresponding to the first polarity.

Thus, switching bridge 22, by virtue of its novel circuit configuration and connection to sensing element 20, provides the ability to easily set sensing polarity by electrically opening parallel resistor branches. The simplicity offered by bridge 22 of the present invention is a significant advantage over the extra contacts, cross-unders, and additional interconnect required by the prior approach of setting polarity using a metal mask option. Also, because bridge 22 shorts the sensing outputs from nodes SP and SM of sensing element 20 prior to the formation of electrical opens in bridge 22, the present invention also offers the unexpected advantage of permitting adjustment of the common mode voltage of sensing element 20 independent of variations in stress or sensitivity.

Figure 2:
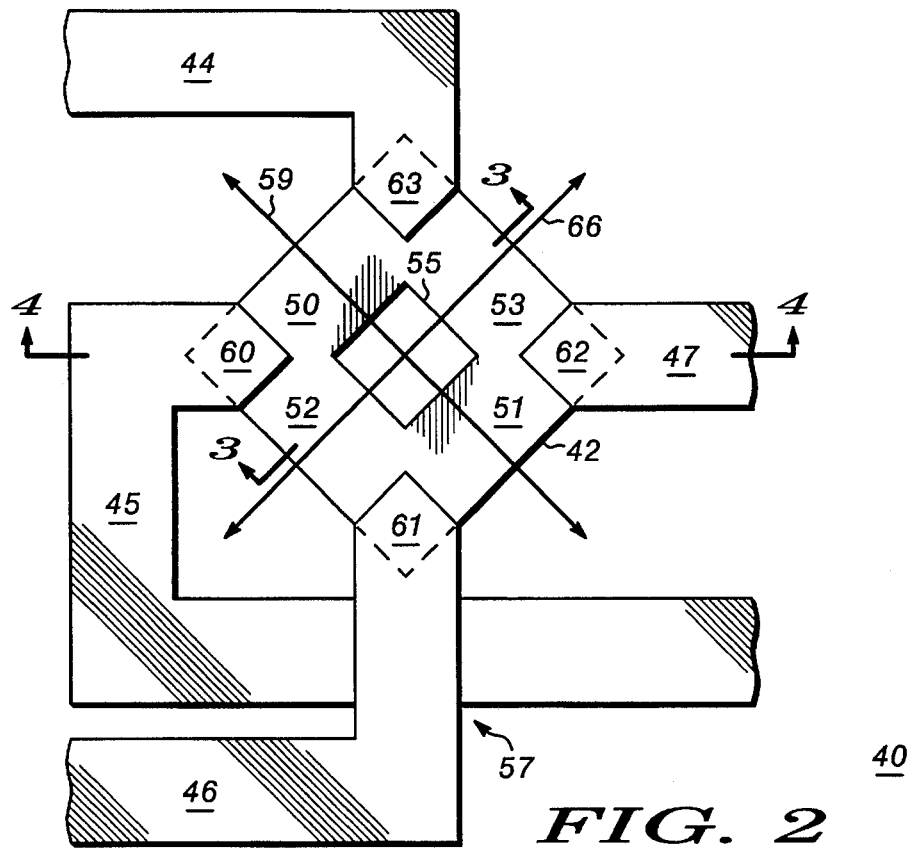
FIG. 2 is a top view of a switching bridge according to a particular embodiment of the present invention.

FIG. 2 is a top view of a switching bridge 40 according to a particular embodiment of the present invention. It should be appreciated that switching bridge 40 is only one of many integrated circuit layouts that can be used to implement switching bridge 22 of FIG. 1. Bridge 40 includes a trimming target film 42 having four conductive legs 44–47 disposed thereon, which radiate symmetrically outward away from film 42, to be in electrical contact at four corners 60–63. Legs 44–47 form a portion of, for example, a metal interconnect level, such as aluminum, and film 42 corresponds to a second layout level below that of legs 44–47. For simplicity, FIG. 2 illustrates only two levels of layout corresponding to film 42 and legs 44–47, but one of skill in the art will recognize that additional conventional layers are also used in forming bridge 40. Legs 44–47 are patterned to connect to other layout, corresponding to sensing element 20 and amplifiers 24 and 26, consistent with the schematic of FIG. 1. A conventional crossover 57 may be used with bridge 40.

Film 42 is formed of a conductive material and has four conductive links 50–53 disposed around a central opening 55. The material used for film 42 is selected to be suitable for laser trimming and is preferably chromium silicon. Also, film 42 preferably has a thickness of about 80–100 angstroms. Laser trimming is performed along only one of laser cut lines 59 or 66, depending on the sensing polarity to be set. Such trimming corresponds to, for example, creating electrical opens in resistors R1 and R2 of bridge 22 in FIG. 1.

An advantage of switching bridge 40 is that laser trimming can be performed along only a single cut line. Also, a manufacturing operator can readily determine the polarity set in sensor device 10 by a visual inspection of bridge 40.

Figure 3:
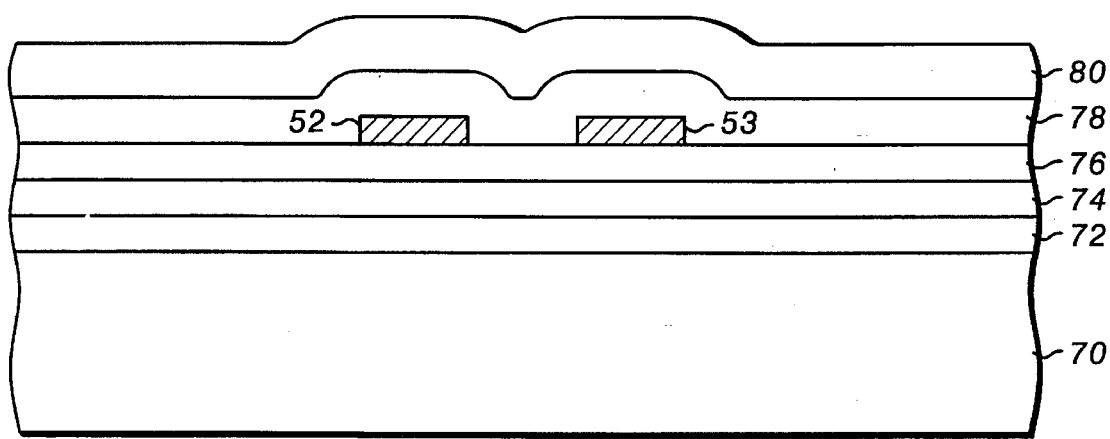
FIGS. 3 and 4 are cross-sectional views of the switching bridge of FIG. 2.
Figure 4:
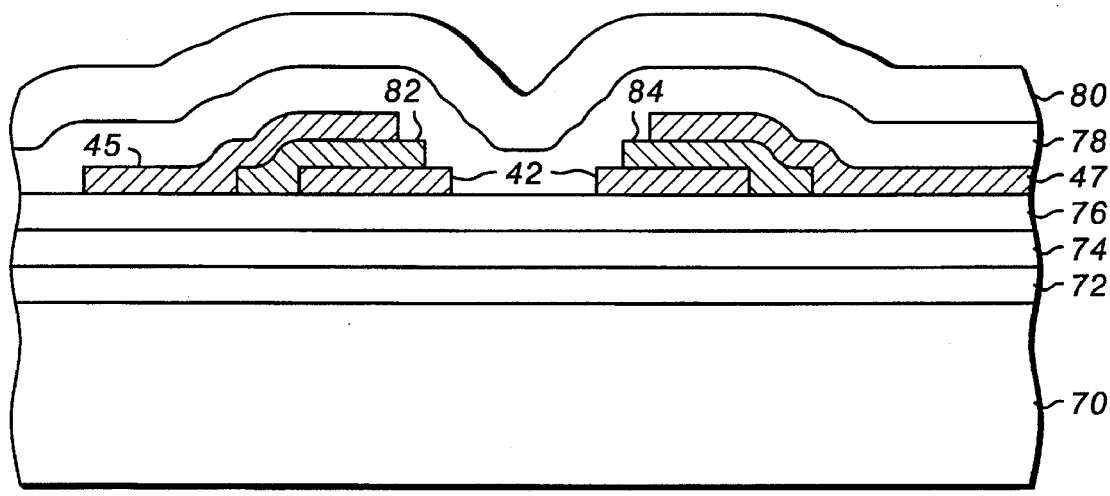

FIGS. 3 and 4 are cross-sectional views of the switching bridge of FIG. 2. Specifically, FIG. 3 illustrates links 52 and 53 of trimming target film 42. Links 52 and 53 are opened when laser trimming is performed along laser cut line 66. Links 52 and 53 are shown overlying a silicon substrate 70, an oxide layer 72, a nitride layer 74, and an oxide layer 76. An oxide layer 78 and a nitride layer 80 are disposed over links 52 and 53. Oxide layers 76 and 78 preferably surround links 52 and 53 so that nitride material does not contact links 52 and 53, thus reducing damage from laser trimming. However, oxide layers 76 and 78 are optional, and links 52 and 53 can instead be surrounded by nitride layers 74 and 80.

FIG. 4 illustrates the connection between legs 45 and 47 and film 42. Prior reference numbers refer to common elements from FIG. 3. Barrier layers 82 and 84 of, for example, titanium tungsten are disposed on film 42 and are used to prevent migration of silicon from film 42 when a chromium silicon material is used therefor. However, barrier layers 82 and 84 are optional.

According to the above method, the sensing polarity can be set using switching bridge 40 after a sensing die containing sensing element 20 has been fully processed and assembled into its final package. Preferably, laser trimming along cut line 59 or 66 is performed just before closing the package by installing a cap or lid. Alternatively, this laser trimming can be done after processing, but prior to assembly. Thus, the sensing polarity can be set substantially just prior to shipment of final parts to customers.

By now, it should be appreciated that there has been provided a novel method for setting sensing polarity in a sensor device. The improved method for setting the sensing polarity of sensor devices according to the present invention does not require the holding of excessive inventories of devices pre-set at the metal mask step for either front or back-side applications. This reduces manufacturing costs, reduces customer order lead times, and avoids the need for a manufacturing distinction between front and back-side applications until the trim-and-test stage.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for setting a sensing polarity of a sensor device, comprising the steps of:

providing a sensing element coupled to a first sensing output node and a second sensing output node;

providing a switching bridge having a first bridge output node and a second bridge output node, a first branch coupled between said second sensing output node and said first bridge output node, a second branch coupled between said first sensing output node and said second bridge output node, a third branch coupled between said second sensing output node and said second bridge output node, and a fourth branch coupled between said first sensing output node and said first bridge output node, wherein said first branch and said second branch correspond to a first polarity of said sensor device and said third branch and said fourth branch correspond to a second polarity of said sensor device; and creating an electrical open circuit in said first branch and said second branch to set said sensor device to said first polarity.

2. The method of claim 1 further comprising the steps of:

coupling a first amplifier between a sensor device output node and said first bridge output node; and coupling a second amplifier between said sensor device output node and said second bridge output node.

3. The method of claim 2 wherein said first amplifier is an operational amplifier.

4. The method of claim 1 wherein said sensor device is a pressure sensor and said sensing element is a strain gauge.

5. The method of claim 1 wherein said switching bridge comprises a chromium silicon film.

6. The method of claim 1 wherein said step of creating an electrical open circuit is performed by laser trimming of said first branch and said second branch.

7. The method of claim 6 wherein only a single laser cut line is used to set said sensing polarity of said sensor device.

8. The method of claim 1 wherein said switching bridge comprises:

an annular trimming target film including four conductive links symmetrically disposed around a central opening to provide four corners; and four conductive legs each in electrical contact with one of said four corners, wherein said four conductive legs correspond one-to-one with said first, second, third, and fourth branches of said switching bridge.

9. The method of claim 8 wherein said target film is chromium silicon.

10. The method of claim 8 wherein said film has a rectangular shape, and said four conductive legs are disposed on top of said film and radiate symmetrically outward away from said film.

11. The method of claim 8 wherein said switching bridge is connected in a wheatstone bridge configuration.

12. The method of claim 8 further comprising a titanium tungsten layer disposed between said film and said four conductive legs, and wherein said target film is chromium silicon, an oxide layer is disposed directly underneath said film, and an oxide layer is disposed directly on top of said film.

13. The method of claim 8 wherein a first link and a second link of said four conductive links are disposed oppositely on said target film and said step of creating an electrical open circuit includes the step of severing said first link and said second link of said target film.

14. The method of claim 13 wherein said step of severing consists essentially of laser trimming along a single cut line.

15. The method of claim 1 further comprising the step of adjusting a common mode voltage of said sensing element prior to said step of creating an electrical open circuit.

16. A method for setting a sensing polarity of a sensor device, comprising the steps of:

providing a sensing element coupled to a first sensing output node and a second sensing output node;

providing a switching bridge having a first bridge output node and a second bridge output node, a first branch coupled between said second sensing output node and said first bridge output node, a second branch coupled between said first sensing output node and said second bridge output node, a third branch coupled between said second sensing out,put node and said second bridge output node, and a fourth branch coupled between said first sensing output node and said first bridge output node, wherein said first branch and said second branch correspond to a first polarity of said sensor device and said third branch and said fourth branch correspond to a second polarity of said sensor device;

adjusting a common mode voltage of said sensing element; and after said step of adjusting a common mode voltage, creating an electrical open circuit in said first branch and said second branch to set said sensor device to said first polarity.

* * * * *

UNITED STATES PATENT AND TRADEMARK OFFICE
CERTIFICATE OF CORRECTION

PATENT NO. : 5,551,304
DATED : September 3, 1996
INVENTOR(S) : Ira E. Baskett

It is certified that error appears in the above-indentified patent and that said Letters Patent is hereby corrected as shown below:

Claim 16, column 6, line 11, remove "out,put" and replace with --output--.

Signed and Sealed this

Seventh Day of January, 1997

Attest:

BRUCE LEHMAN

*Attesting Officer*     *Commissioner of Patents and Trademarks*